(12) United States Patent
Moles et al.

(10) Patent No.: US 9,828,076 B2
(45) Date of Patent: Nov. 28, 2017

(54) REMOTELY OPERATED VEHICLE POWER MANAGEMENT SYSTEM AND METHOD OF USE

(71) Applicant: OCEANEERING INTERNATIONAL, INC., Houston, TX (US)

(72) Inventors: Peter Andrew Robert Moles, Cypress, TX (US); Kevin Frances Kerins, The Woodlands, TX (US); Scott Beggs, Maurice, LA (US)

(73) Assignee: OCEANEERING INTERNATIONAL, INC., Houston, TX (US)

( * ) Notice: Subject to any disclaimer, the term of this patent is extended or adjusted under 35 U.S.C. 154(b) by 0 days.

(21) Appl. No.: 14/695,759

(22) Filed: Apr. 24, 2015

(65) Prior Publication Data

US 2015/0307173 A1    Oct. 29, 2015

Related U.S. Application Data

(60) Provisional application No. 61/984,670, filed on Apr. 25, 2014.

(51) Int. Cl.
*B63G 8/00* (2006.01)
*B63G 8/14* (2006.01)
*G05D 1/00* (2006.01)

(52) U.S. Cl.
CPC ............... *B63G 8/001* (2013.01); *B63G 8/14* (2013.01); *G05D 1/0022* (2013.01); *B63G 2008/007* (2013.01)

(58) Field of Classification Search
CPC .................................. B63G 8/001; B63G 8/14
See application file for complete search history.

(56) References Cited

U.S. PATENT DOCUMENTS

| 6,167,831 B1 * | 1/2001 | Watt ....................... B63G 8/001 114/245 |
| 2011/0198092 A1 * | 8/2011 | Machin ................. E21B 17/012 166/349 |

* cited by examiner

*Primary Examiner* — Rexford Barnie
*Assistant Examiner* — Terrence Willoughby
(74) *Attorney, Agent, or Firm* — Maze IP Law PC

(57) ABSTRACT

A power management system comprises a remotely operated vehicle (ROV), a tether management system (TMS), and an umbilical operatively in communication with the TMS external electrical power interface and the TMS-to-ROV umbilical interface. The system can be configured to provide electrical power management that moves some or all of the electrical power required for ROV propulsion and tooling to the ROV and/or TMS, and maximizes available power and manages loads across all systems as necessary and by priority. Power management may also be required that features intelligent routing of power to subsystems and integration of variable frequency drives (VFDs).

20 Claims, 7 Drawing Sheets

REMOTELY OPERATED VEHICLE POWER MANAGEMENT SYSTEM AND METHOD OF USE

RELATION TO PRIOR APPLICATIONS

This application claims the benefit of, and priority through, U.S. Provisional Application 61/984,670, titled "Remotely Operated Vehicles and Components," filed Apr. 25, 2014.

FIELD OF THE INVENTION

The following relates generally to providing power to subsea structures which need power, especially electrical power, including remotely operated vehicles and subsea packages.

BACKGROUND OF THE INVENTION

Many issues are currently facing the remotely operated vehicle (ROV) market, giving rise to a need for simplification of operations and maintenances, near zero fluid emissions, configurable and scalable intervention capabilities, and power management between ROV system and tools.

One way to address some of these issues is to provide electrical power management that moves to electrical power for ROV propulsion and tooling, and maximizes available power and manages loads across all systems as necessary and by priority. Power management may also be required that features intelligent routing of power to subsystems and integration of variable frequency drives (VFDs).

FIGURES

The figures supplied herein disclose various embodiments of the claimed inventions.

DESCRIPTION OF VARIOUS EMBODIMENTS

In general, the invention described generally herein can divert main ROV power to tooling systems, skids, and external systems. The disclosed ROV can share or turn over its control systems to tooling systems, including skids and external systems.

Figure 1:
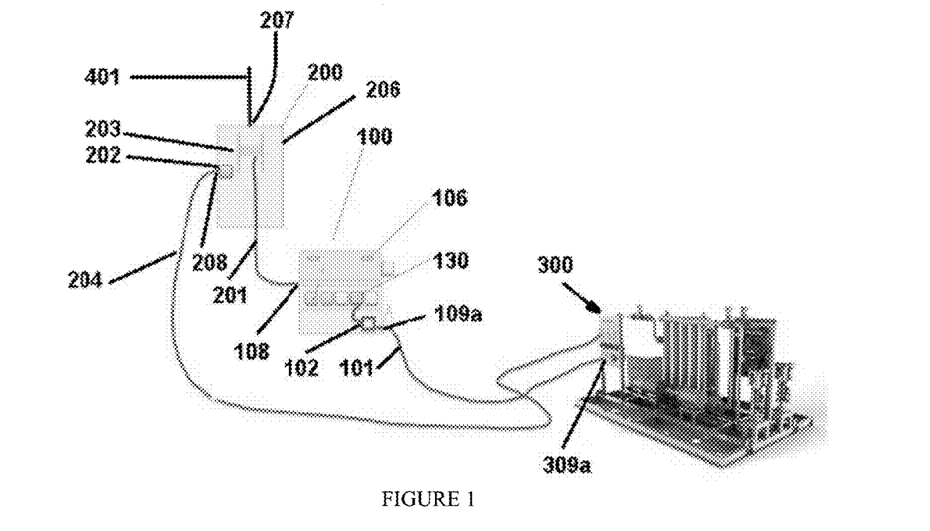
FIG. 1 is a block diagram of a general embodiment of the claimed invention.

Referring now to FIG. 1, in an exemplary embodiment power management system 1 comprises remotely operated vehicle (ROV) 100 comprising main management system 130; ROV signal diverter 102 operatively in communication with main management system 130 and configured to divert a portion of a power and/or data signal available in or to ROV 100 via ROV main management system 130 to subsea system 300; and subsea system interface 109a operatively in communication with ROV signal diverter 102. Subsea system interface 109a is configured to interface with signal connector 309a of subsea system 300. As used herein, subsea system 300 may comprise a tooling system, a skid, an external system, or the like or a combination thereof.

Umbilical 101 is typically present and configured to operatively interface with subsea system interface 109a and signal connector 309a.

Figure 2:
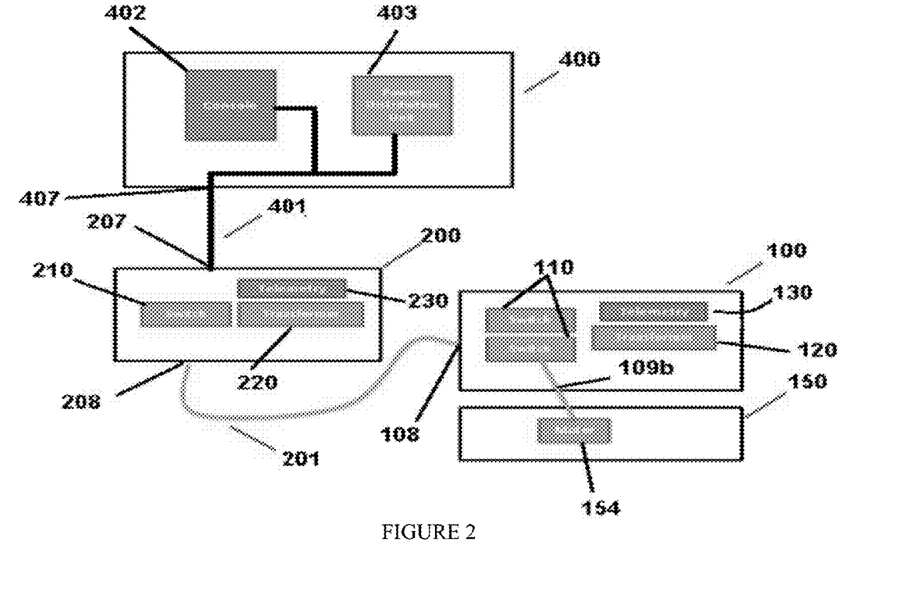
FIG. 2 is a block diagram of a general embodiment of the claimed invention.

Typically, ROV signal diverter 102 is configured to interface with and divert or otherwise provide electrical power to subsea system 300 sufficient to power subsea system 300 without using power supplied from a source external to ROV 100 such as control van 400 (FIG. 2). In such cases, signal connector 101 is configured to carry a power signal sufficient to power subsea system 300 supplied by ROV 100 without having to using power supplied from a source external to ROV 100 such as remote system 400 and umbilical 101 is configured to handle that power sufficient to power subsea system 300.

In other embodiments, ROV signal diverter 102 is configured to interface with and divert hydraulic power to subsea system 300 sufficient to power subsea system 300 without using power supplied from a source external to ROV 100. In other contemplated embodiments, ROV signal diverter 102 may be configured to interface with and divert electrical power and/or hydraulic power to subsea system 300 sufficient to power subsea system 300 without using power supplied from a source external to ROV 100.

In each of these embodiments, ROV signal diverter 102 may further comprise power management module 130 configured to selectively divert power for ROV propulsion and/or tooling, maximize available power, and manage loads across all systems as necessary and by priority.

ROV 100 may be configured to power up, power down, or enter low power mode.

Where ROV signal diverter 102 further comprises a data signal interface, ROV signal diverter 102 is typically further configured to provide an interface between a data signal processor in ROV 100 and a data signal processor in subsea system 300.

ROV 100 typically further comprises umbilical interface 108 configured to interface with an external umbilical such as TMS-to-ROV umbilical 201. Umbilical interface 108 may therefore be configured to be operatively in communication with data signaling and power signaling from an external source. These data signals may comprise telemetry signaling and ROV telemetry controller 130 may further comprise a data signal processor configured to monitor a status of ROV 100 and/or subsea system 300 and adjust power diversion from ROV 100 to subsea system 300 in response to a monitored status value.

Referring now generally to FIGS. 2-10, in further embodiments, power management system 1 comprises ROV 100, tether management system (TMS) 200, and umbilical 401 operatively in communication with power umbilical interface 407 and TMS-to-ROV umbilical interface 207. Remote power station 400, which may comprise a control van, is typically present, comprising power generator 403; power management controller 402, configured to receive a set of data telemetry signals and issue a set of control commands; and one or more power umbilical interfaces 407 configured to be complimentary to a corresponding set of TMS-to-surface umbilical interfaces 207 via one or more remote-to-TMS umbilicals 401 configured to interconnect and operatively be in communication with power umbilical interface 407 and an associated TMS-to-surface umbilical interface 207.

ROV 100 typically comprises one or more TMS-to-ROV umbilical interfaces 108 configured to receive electrical power; one or more ROV signal diverters operative to act at least as ROV power distributors 102 (FIG. 3), distributing at least a power signal, where ROV power distributors 102 are operatively in communication with a predefined set of TMS-to-ROV umbilical interfaces 108 and configured to distribute electrical power; one or more ROV electrical power supplies 140 (FIG. 3) operatively in communication with ROV power distributor 102; one or more ROV telemetry controllers 130; one or more ROV external electrical power interfaces 109 such as 109*a* and/or 109*b* (FIG. 3); and one or more ROV electrical switches 110 which may be operatively in communication with a predefined set of ROV power distributors 102, ROV electrical power supplies 140, and/or ROV external electrical power interfaces 109.

Each ROV electrical switch 110 may be configured to selectively allow electrical power to flow from its associated TMS-to-ROV umbilical interface 108 to its associated ROV electrical power supply 140 (FIG. 3) and/or to selectively allow electrical power to flow from its associated TMS-to-ROV umbilical interface 108 to its associated ROV external electrical power interface 109.

ROV 100 may further comprise one or more ROV-to-skid electrical power interfaces 109*b* operatively in communication with an associated set of ROV electrical switches 110. These ROV-to-skid electrical power interfaces 109*b* are generally configured to provide electrical power to skid 150 disposed proximate ROV 100. In certain embodiments where ROV electrical switch 110 comprises a plurality of ROV electrical switches 110, ROV 100 may comprise one or more ROV-to-skid electrical power interfaces 109*b* where at least one of the plurality of ROV electrical switches 110 is operatively in communication with a predefined set of the plurality of ROV external electrical power interfaces 109 and with an associated ROV-to-skid electrical power interface 109*b*.

Figure 3:
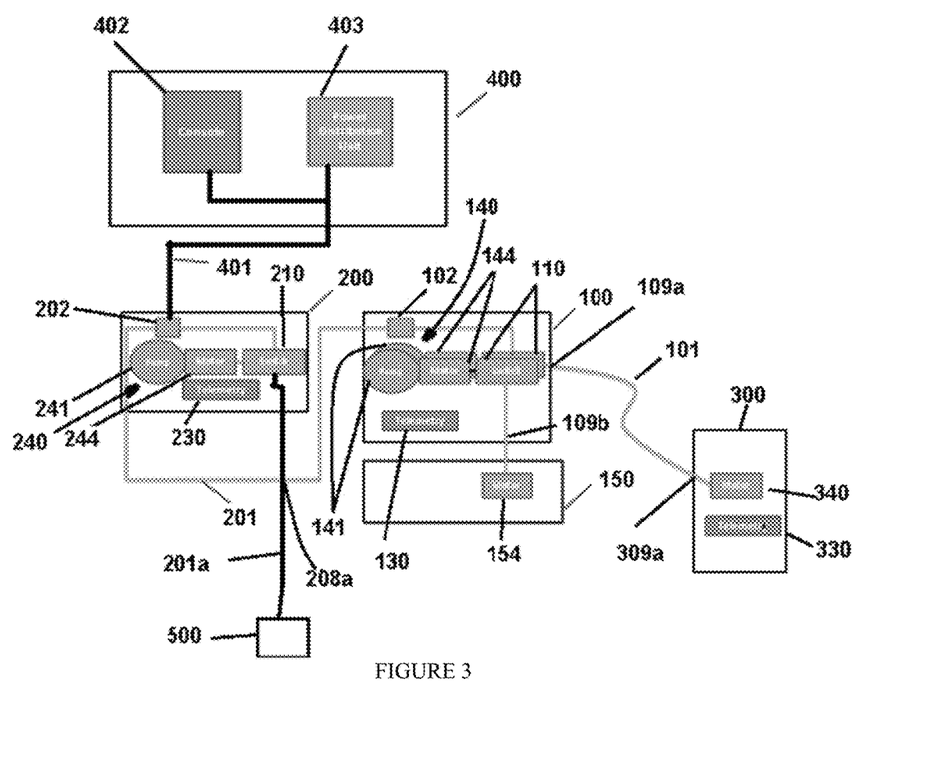
FIG. 3 is a block diagram of a general embodiment of the claimed invention.

Referring additionally and in general to FIG. 3, ROV power supply 140 may comprise one or more electrical ROV power transformers 120 (FIG. 2), one or more electrical generators 144 which may comprise an electric motor, one or more batteries, or the like, or a combination thereof.

Each ROV electrical generator 140 may further comprise one or more pumps 141 and associated electrical generators 144. Where ROV power supply 140 comprises a plurality of electrical generators 144, ROV electrical switch 110 may further comprise a corresponding plurality of ROV electrical switches 110, each ROV electrical switch 110 operatively in communication with a predetermined electrical generator 144 of the plurality of ROV electrical generators 144.

Figure 4:
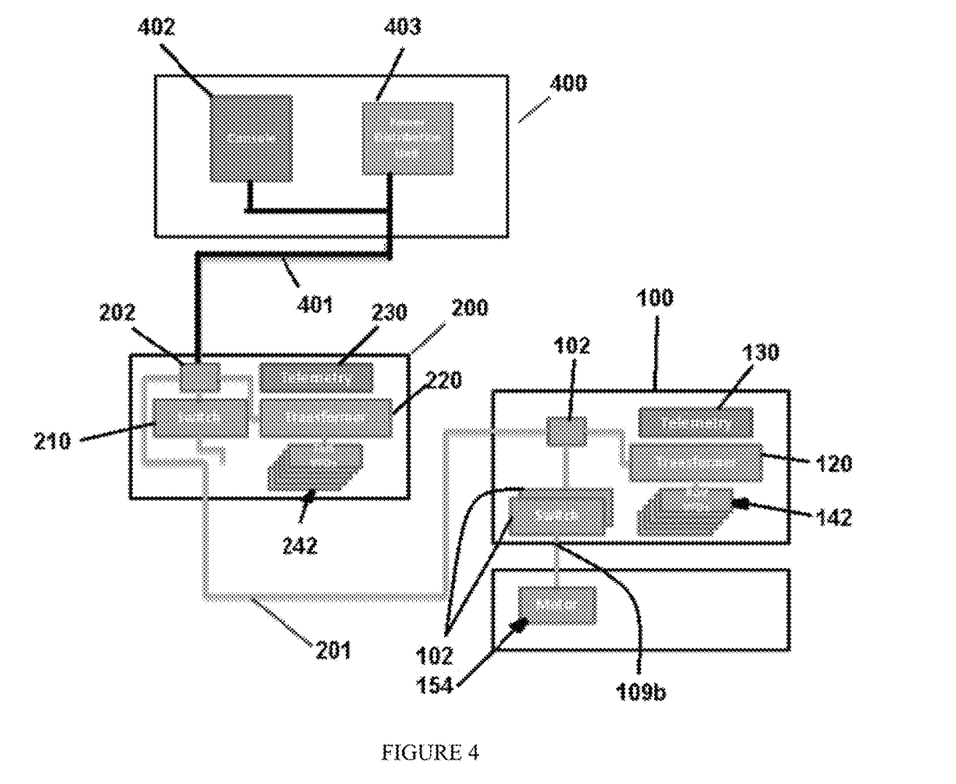
FIG. 4 is a block diagram of a general embodiment of the claimed invention.

Referring additionally and in general to FIG. 4, if electrical ROV power transformer 120 is present, ROV power supply 140 may further comprise one or more other types of power controllers such as ROV variable frequency drives (VFD) 142 operatively in communication with an associated ROV transformer 120. Any ROV VFD 142 may comprise a first set of VFDs 142 configured to provide electrical power to subsea package 300 (FIG. 2) and a second set of VFDs 142 configured to provide electrical power to ROV 100. Where a second set of VFDs 142 is present, a set of ROV-to-skid electrical power interfaces 109*b* (FIG. 2) may also be present and operatively in communication with one or more ROV VFD 142 of the second set of VFDs 142.

ROV telemetry controller 130 is typically configured to monitor data and may further comprise control logic sufficient to analyze data so monitored and issue one or more control commands based on the monitored data. ROV telemetry controller 130 typically comprises one or more data transceivers.

Referring back to FIG. 2 and FIG. 3, TMS 200 typically comprises housing 206 (FIG. 1), one or more TMS telemetry controllers 230 disposed at least partially within housing 206; one or more TMS-to-surface umbilical interfaces 207 disposed at least partially within housing 206 and configured to receive electrical power from a remote electrical power source such as control van 400; one or more TMS power distributors 202 (FIG. 3) disposed at least partially within housing 206 and operatively in communication with an associated set of TMS-to-surface umbilical interface 207 and configured to distribute electrical power; one or more TMS external electrical power interfaces 208 disposed at least partially within housing 206 and operatively in communication with an associated TMS power distributor 202; one or more TMS electrical power supplies 240 (FIG. 3) disposed at least partially disposed within housing 206; one or more TMS electrical switches 210 (FIG. 3) disposed at least partially within housing 206 and operatively in communication with an associated set of TMS power distributors 202, TMS electrical power supplies 240, and TMS external electrical power interfaces 208, and one or more first TMS-to-ROV umbilical interfaces 208 disposed at least partially within housing 206 operatively in communication with an associated set of TMS power distributors 202.

TMS 200 may further comprise one or more second TMS-to-device umbilical interfaces 208*a* (FIG. 3) operatively in communication with one or more associated TMS power distributors 202 (FIG. 3) and/or one or more TMS electrical switches 210. Typically, TMS-to-device umbilical interfaces 208*a* may be used to connect TMS 200 to a subsea device such as an ROV 100 via an umbilical such as 201, one or more tools 500 such as via umbilical 201*a*, one or more subsea packages 300 such as via umbilical 204, or the like.

At least one TMS-to-subsea package umbilical 401 is generally present, operatively interconnecting TMS 200 and a source external to ROV 100 such as control van 400. Spool 203 (FIG. 1) may be present as well and at least partially disposed within housing 206. Spool 203 allows for take-up and play-out of TMS-to-subsea package umbilical 401.

Each TMS electrical switch 210, either singly or as a member of a plurality of TMS electrical switches 210, is typically operatively in communication with at least one associated TMS power distributor 202 (FIG. 3). Each TMS electrical switch 210 is typically configured to selectively allow electrical power to flow from its associated TMS power distributor 202 to its associated TMS electrical power supply 240 and/or to selectively allow electrical power to flow from its associated TMS power distributor 202 to an associated TMS external electrical power interface, e.g. TMS external electrical power interface 208*a*.

TMS power supply 240 may comprise one or more batteries, TMS electrical power transformers 220, and/or one or more TMS electrical generators 244 (FIG. 3). TMS electrical generators 244 may be associated with one or more TMS pumps 241 (FIG. 3). Each TMS electrical generator 244 may comprise one or more TMS pumps 241 Each TMS electrical generator 244 may comprise one or more TMS pumps 241, typically hydraulic pumps, and an associated set of electrical motors.

Referring additionally to FIG. 4, where TMS power supply comprises at least one TMS electrical power transformer 220, TMS power supply 240 may further comprise one or more other types of power sources controllers such as batteries and/or TMS VFDs 242 operatively in communication with an associated TMS electrical power transformer 220. These TMS VFDs 242 may comprise a first set of TMS VFDs 242 operatively in communication with an associated TMS power distributor 202 and a second set of TMS VFDs 242 operatively in communication with an associated TMS power distributor 202 and with one or more subsea tools 500 (FIG. 3). One or more TMS-to-tool electrical interfaces 208a (FIG. 3) may be operatively in communication with a predefined member of the second set of TMS VFDs 242 and/or with a predefined TMS switch 210 and subsea tool 500 (FIG. 3).

TMS telemetry controller 230 is typically configured to monitor data and may further comprise control logic sufficient to analyze data so monitored and issue one or more control commands based on the monitored data. TMS telemetry controller 230 typically comprises one or more data transceivers.

Referring back to FIG. 2 and FIG. 3, in general, either or both of ROV external electrical power interface 108 or TMS external power interface 208 is configured to provide electrical power to a subsea package such as subsea package 300 (FIG. 3). Subsea package 300 typically comprises one or more power interfaces 309 such as 309a (FIG. 3) configured to accept electrical power from ROV external electrical power interface 109 such as 109a (FIG. 3), TMS external power interface 208, or both.

One or more subsea package electric motors 340 (FIG. 3) may be associated with subsea package 300, where a predetermined set of subsea package electric motors 340 is operatively in communication with an associated power interface 309, e.g. 309a. Additionally, one or more subsea package telemetry controllers 330 (FIG. 3) may be present and associated with subsea package 300.

Further, one or more ROV-to-subsea package umbilicals 101 and/or TMS-to-subsea package umbilicals, e.g. 204 (FIG. 2), may be present, each operatively in communication with an associated subsea package power interface 309. Each ROV-to-subsea package umbilical 101 may be operatively in communication with a predetermined set of subsea package telemetry controllers 330 (FIG. 3) and an associated ROV telemetry controller 130 (FIG. 2). Similarly, each TMS-to-subsea package umbilical 204 may be operatively in communication with a predetermined set of subsea package telemetry controllers 330 and an associated TMS telemetry controller 230 (FIG. 2).

As illustrated in FIG. 4, ROV 100 may further comprise one or more ROV VFDs 142 operatively in communication with an associated ROV power distributor 102 and configured to provide power to one or more subsea tools 500 (FIG. 3) or skids 150 via an associated ROV power interface 109, e.g. 109b.

Figure 5:
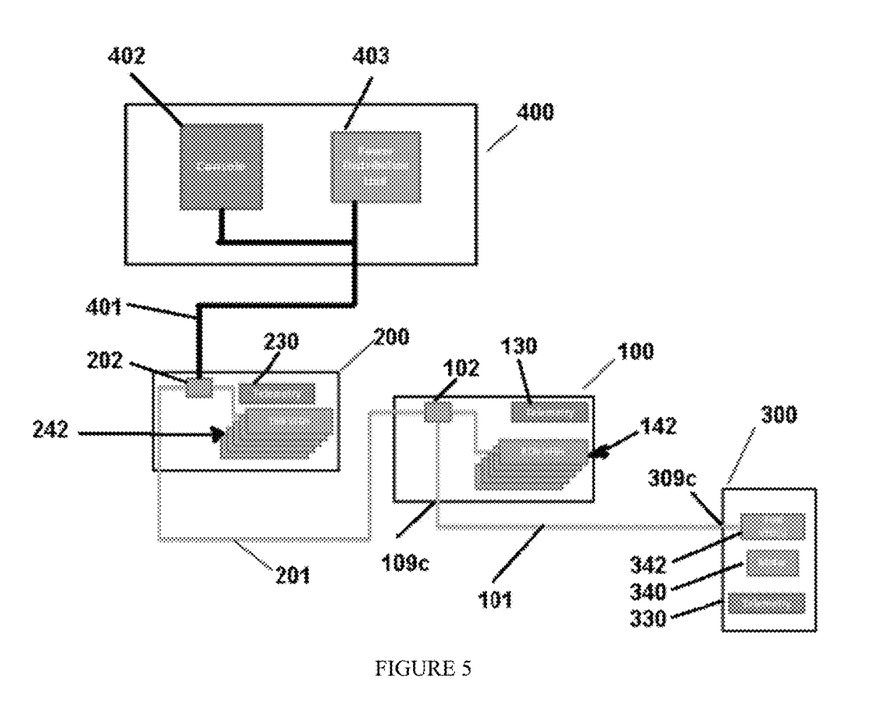
FIG. 5 is a block diagram of a general embodiment of the claimed invention.
Figure 6:
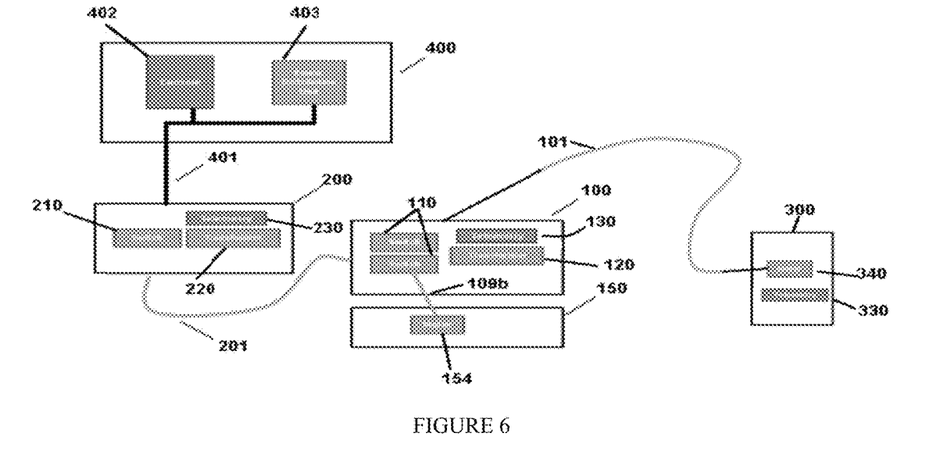
FIG. 6 is a block diagram of a general embodiment of the claimed invention.
Figure 7:
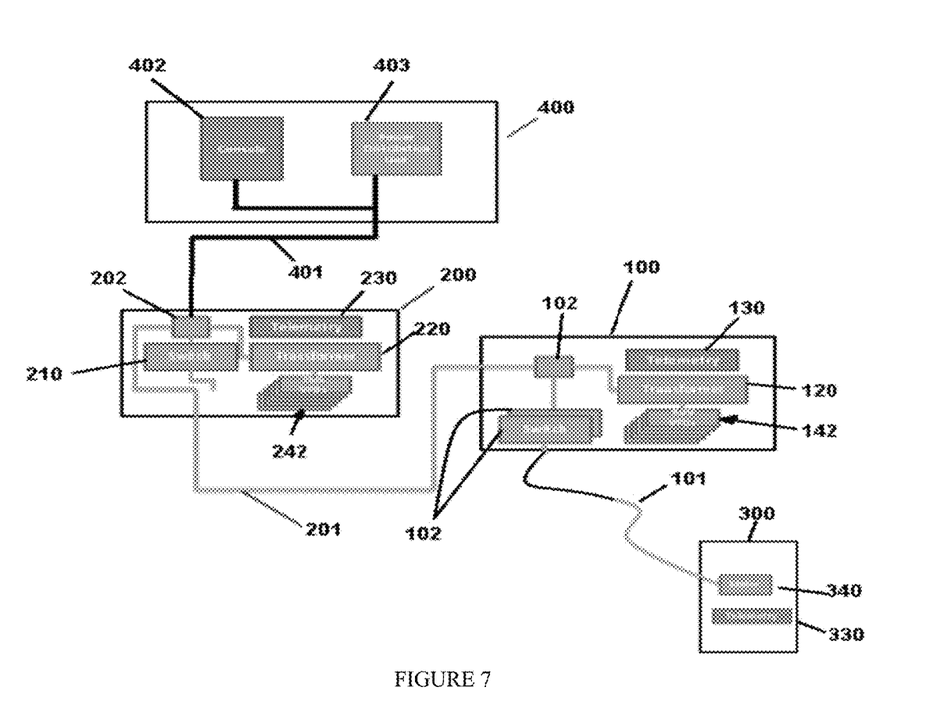
FIG. 7 is a block diagram of a general embodiment of the claimed invention.

Referring to FIG. 5, subsea package 300 may also further comprise one or more package tool VFD power interfaces 309c configured to accept power via tool VFD power interface 109c such as through umbilical 101 and have that power routed to one or more package tool VFDs 342 operatively in communication with tool VFD power interface 109c. One or more ROV-to-tool umbilicals 101 may be present for these configurations, interconnecting and operatively in communication with ROV tool VFD power interface 109c and an associated package tool VFD power interface, e.g. 309c.

Figure 8:
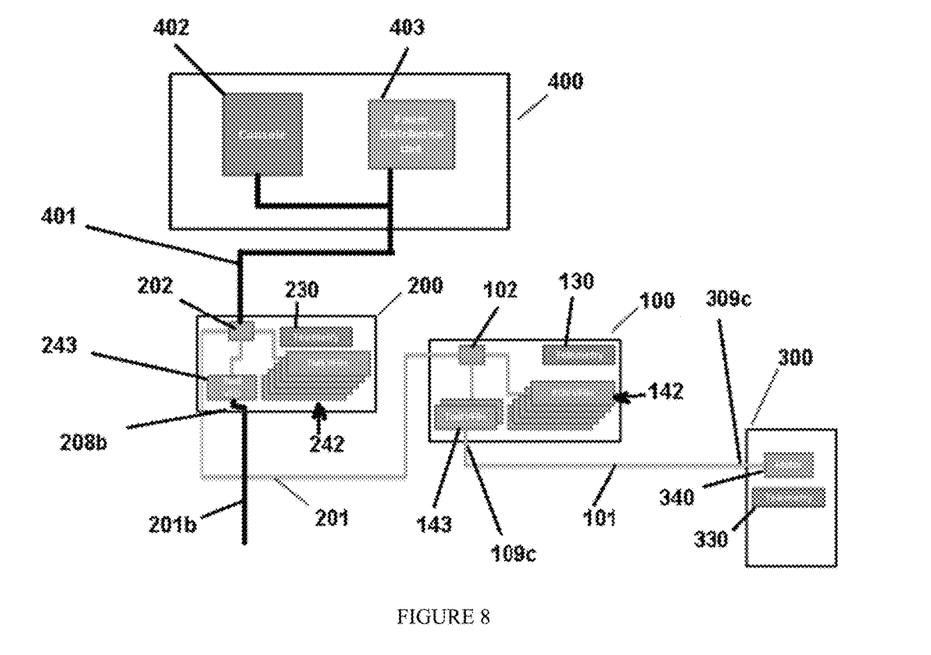
FIG. 8 is a block diagram of a general embodiment of the claimed invention.
Figure 9:
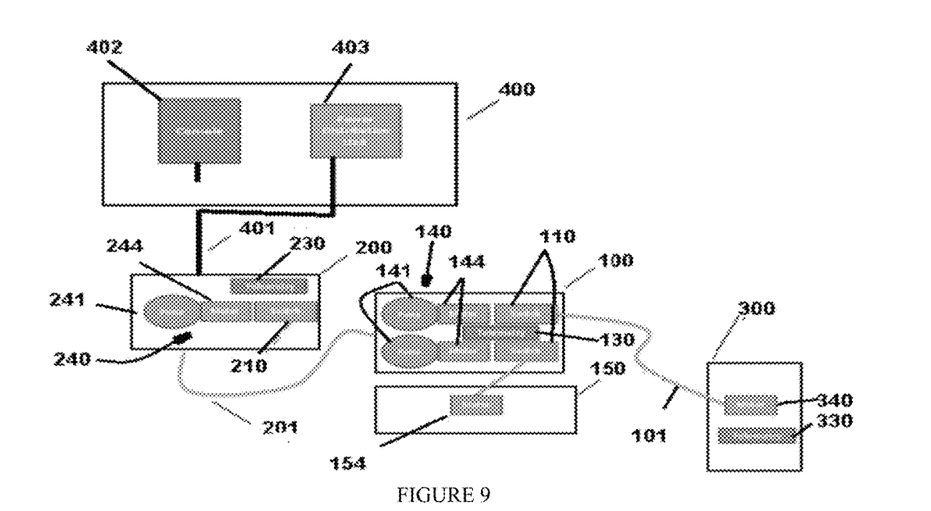
FIG. 9 is a block diagram of a general embodiment of the claimed invention.
Figure 10:
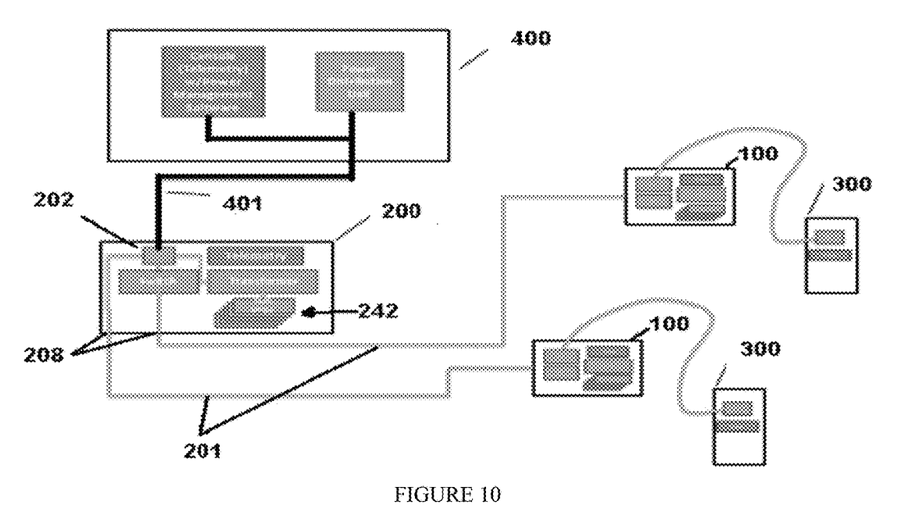
FIG. 10 is a block diagram of a general embodiment of the claimed invention.

Referring additionally to FIG. 8, TMS power supply 240 may further comprise a set of TMS variable frequency drives 242 operatively in communication with TMS power distributor 202 and a second set of tool variable frequency drives 243 operatively in communication with TMS power distributor 202. Second set of tool variable frequency drives 243 may be operatively connected to TMS-to-tool electrical interface 208b and one or more tools 500 (FIG. 3) such as via umbilical 201b.

ROV 100 may further comprise one or more RMS tool VFDs 143 operatively in communication with ROV power distributor 102 and one or more ROV tool VFD power interfaces 109c configured to provide power to tool 500 or subsea package 300. In these configurations, subsea package 300 may further comprise one or more package tool VFD power interfaces 309c configured to accept power from the ROV tool VFD power interface 109c and one or more package tool VFDs 342 (FIG. 5) operatively in communication with ROV tool VFD power interface 109c. ROV-to-tool umbilical 101 may be used to interconnect ROV tool VFD power interface 109c and package tool VFD power interface 309c.

In the operation of exemplary embodiments, referring generally to FIG. 3, signaling, whether power, data, or both, may be provided to subsea system 300 and/or subsea tool 500 from ROV 100 subsea by maneuvering ROV 100, as described above, proximate subsea system 300, as described above.

Once positioned, ROV 100 is used to interconnect ROV-to-subsea umbilical 101 to subsea system interface 109a and power connector 309a. ROV signal diverter 120 may then be used to divert a predetermined portion of power available in ROV 100, such as using ROV main management system 130, to subsea system 300 sufficient to power subsea system 300 without using power supplied from a source external to ROV 100.

Generally, electrical power comprises a high voltage power signal which may originate at a remote site such as control van 400 and travel from that remote site, e.g. control van 400, to TMS 200 via TMS-to-surface umbilical 401. One or more TMS transformers 220 (FIG. 2) may be used to step the high voltage down to a lower voltage.

Similarly, voltage provided by TMS 200 to ROV 100 via TMS-to-ROV umbilical 201 may be stepped down to a lower voltage using one or more ROV transformers 120 (FIG. 2). ROV 100 itself may generate power without needing power from control van 400 or TMS 200 such as by using one or more ROV power generators 140.

Power can be provided proportionally between ROV 100, subsea package 300, and tools 500 and adjusted during operations. By way of example and not limitation, ROV signal diverter 102, as described above, may consist of or otherwise comprise a data signal interface, in which case the ROV signal diverter 102 data signal interface is interfaced to one or more ROV data signal processors such as ROV telemetry controller 130 and one or more subsea system data signal processors such as TMS telemetry controller 230 and/or such as subsea package telemetry controller 330. Switches, whether ROV switch 110 or TMS switch 210, may be configured to act as simple on/off switches. This can allow TMS 200, via TMS switch 210, to provide power management to one or more ROVs 110 (FIG. 10), one or more subsea packages 300, and/or one or more tools 500 and allow ROV 100, via ROV switch 110, to provide power management to skid 150, one or more subsea packages 300, and/or one or more tools 500 such as to isolate failure of a faulty subsea package 300 and/or tool 500. By way of further example and not limitation, ROV switch 110 can allow for a total disconnect of one or more ROV VFDs 142 or a hydraulic power unit such as illustrated with pumps 241 and generators 244.

After being operatively interconnected, ROV telemetry controller 130 can monitor one or more subsea system statuses via a data signal interface and power diversion may be adjusted accordingly, if and when needed, from ROV 100 to subsea system 300 in response to a monitored status value. By way of example and not limitation, this can allow control van 400, TMS 200, and/or ROV 100 to monitor various status parameters and isolate failures, e.g. if ROV switch 110 is placed in front of ROV VFD 142 (FIG. 4), ROV switch 110 can disable ROV VFD 142 to isolate failure of ROV VFD 142.

As noted above, ROV power supply 140 may be used solely for use by ROV 100, diverted in part to power skid 150 and/or one or more components present in skid 150 such as motor 154, diverted in part to one or more subsea packages 300 and/or one or more components present in subsea package 300, or the like, or a combination thereof.

TMS power supply 240 may be used solely for use by TMS 200, by one or more components present in TMS 200, diverted in part to one or more ROVs 100, diverted in part to one or more subsea packages 300, diverted in part to one or more tools 500 (FIG. 1), diverted in part to one or more skids 150, or the like, or a combination thereof.

Referring to FIG. 2, distribution of power management may include using distributed software present in control van 400, TMS 200 such as in TMS telemetry controller 230, ROV 100 such as in ROV telemetry controller 130, or a combination thereof. As used herein, power management is essentially switching power on and off to various components, such as tools 500 (FIG. 3), while providing power to ROV 100, e.g. to ROV transformer 120, where ROV transformer 120 drives various independent motor drivers such as for use as thrusters 106 (FIG. 1). It also may include monitoring various parameters, such as via use of ROV telemetry controller 130, including by way of example and not limitation measuring total power available and making sure a power budget is not exceeded except, perhaps, for brief periods. Additionally, other parameters may be monitored, e.g. to make sure that power does not cause cable heating. Additionally, using switches 210 and/or 110, power can be turned on and off; faults, if any, isolated such as by using a VFD such as 242 or 142 (FIG. 4); and/or power adjusted proportionally between the systems as necessary. These adjustments make be made to match power required by tool 500 to environmental conditions, e.g. if dredging, conditions of soil by adjusting pressure and flow of the dredging pump and/or if fluid injection, maximizing flow or pressure of the injection pump, and the like; to maximize power available to ROV 100 if it is needed to be moved to another position, power another tool 500, or hold its position in a changing current; to maximize system performances to reduce mission time while ensuring the system is operating within a set of requirements, e.g. temperature requirements, particularly umbilicals such as 401, 201, and 101; and/or to minimize power for maximum power efficiencies such as for resident ROVs 100.

The foregoing disclosure and description of the invention is illustrative and explanatory. Various changes in the size, shape, and materials, as well as in the details of the illustrative construction and/or an illustrative method may be made without departing from the spirit of the invention.

What is claimed is:

1. A power management system, comprising:
   a remotely operated vehicle (ROV), comprising:
   a TMS-to-ROV umbilical interface configured to receive electrical power;
   an ROV power distributor operatively in communication with the TMS-to-ROV umbilical interface and configured to distribute electrical power;
   an ROV electrical power supply operatively in communication with the ROV power distributor;
   an ROV telemetry controller;
   an ROV external electrical power interface;
   an ROV electrical switch operatively in communication with the ROV power distributor, the ROV electrical power supply, and the ROV external electrical power interface, the ROV electrical switch configured to selectively allow electrical power to flow from the TMS-to-ROV umbilical interface to the ROV electrical power supply or to selectively allow electrical power to flow from the TMS-to-ROV umbilical interface to the ROV external electrical power interface;
   a tether management system (TMS), comprising:
   a TMS telemetry controller;
   a TMS-to-surface umbilical interface configured to receive electrical power from a remote electrical power source;
   a TMS power distributor operatively in communication with the TMS-to-surface umbilical interface and configured to distribute the electrical power;
   a TMS external electrical power interface operatively in communication with the TMS power distributor;
   a TMS electrical power supply;
   a TMS electrical switch operatively in communication with the TMS power distributor, the TMS electrical power supply, and the TMS external electrical power interface, the TMS electrical switch configured to selectively allow electrical power to flow from the TMS power distributor to the TMS electrical power supply and/or to selectively allow electrical power to flow from the TMS power distributor to the TMS external electrical power interface; and
   a first TMS-to-ROV umbilical interface operatively in communication with the TMS power distributor; and
   an umbilical operatively in communication with the TMS external electrical power interface and the first TMS-to-ROV umbilical interface.

2. The power management system of claim 1, wherein the ROV further comprises an ROV-to-skid electrical power interface operatively in communication with the ROV electrical switch, the ROV-to-skid electrical power interface configured to provide electrical power to a skid disposed proximate the ROV.

3. The power management system of claim 1, wherein:
   the ROV electrical switch comprises a plurality of electrical switches;
   the ROV comprises an ROV-to-skid electrical power interface;
   one of the plurality of electrical switches is operatively in communication with the ROV external electrical power interface; and one of the plurality of electrical switches is operatively in communication with the ROV-to-skid electrical power interface.

4. The power management system of claim 1, wherein the ROV power supply comprises an electrical power transformer.

5. The power management system of claim 4, wherein the ROV power supply comprises an ROV variable frequency drive (VFD) operatively in communication with the electrical power transformer.

6. The power management system of claim 5, wherein the ROV VFD comprises:
a first set of ROV VFDs configured to provide electrical power to a subsea package;
a second set of ROV VFDs configured to provide electrical power to the ROV; and
an ROV-to-skid electrical power interface operatively in communication with either the first set or the second set of ROV VFDs.

7. The power management system of claim 1, wherein:
the ROV power supply comprises a plurality of an electrical generators; and
the ROV electrical switch comprises a corresponding plurality of ROV electrical switches, each ROV electrical switch operatively in communication with one of the plurality of electrical generators.

8. The power management system of claim 1, wherein the ROV telemetry controller is configured to monitor data and issue a control command based on the monitored data.

9. The power management system of claim 1, wherein:
the TMS further comprises an electrical power transformer; and
the TMS power supply further comprises a TMS variable frequency drive (VFD) operatively in communication with the electrical power transformer.

10. The power management system of claim 1, wherein the TMS power supply further comprises:
a first set of TMS variable frequency drives operatively in communication with the TMS power distributor;
a second set of tool variable frequency drives operatively in communication with the TMS power distributor; and
a TMS-to-tool electrical interface operatively in communication with the second set of tool variable frequency drives.

11. The power management system of claim 1, wherein the TMS further comprises a second TMS-to-ROV umbilical interface operatively in communication with the TMS power distributor and configured to operatively connect and provide power to a subsea device.

12. The power management system of claim 1, wherein the TMS electrical switch comprises a plurality of TMS electrical switches operatively in communication with the TMS power distributor.

13. The power management system of claim 1, wherein the TMS telemetry controller is configured to monitor data and issue a control command based on the monitored data.

14. The power management system of claim 1, wherein the ROV external electrical power interface is configured to provide electrical power to a subsea package.

15. The power management system of claim 14, further comprising:
a subsea package, comprising:
a power interface configured to accept electrical power;
an electric motor operatively in communication with the power interface; and
a subsea package telemetry controller; and
an ROV-to-subsea package umbilical operatively in communication with the power interface.

16. The power management system of claim 15, wherein the ROV-to-subsea package umbilical is operatively in communication with the subsea package telemetry controller and the ROV telemetry controller.

17. The power management system of claim 15, wherein:
the ROV further comprises:
a tool VFD operatively in communication with the ROV power distributor; and
an ROV tool VFD power interface configured to provide power to a tool;
the subsea package further comprises:
a package tool VFD power interface configured to accept power from the tool VFD power interface; and
a package tool VFD operatively in communication with the tool VFD power interface; and
an ROV-to-tool umbilical in communication with the ROV tool VFD power interface and the package tool VFD power interface.

18. The power management system of claim 1, further comprising: a remote power station, comprising:
a power generator;
a power management controller configured to receive a data telemetry signal and issue a control command; and
a power umbilical interface; and
a remote-to-TMS umbilical operatively in communication with the power umbilical interface and the TMS-to-surface umbilical interface.

19. A method of providing signaling to a subsea system from a remotely operated vehicle subsea, comprising:
maneuvering a power management system proximate a subsea system, the subsea system comprising a subsea system interface and a power connector, the power management system comprising:
a remotely operated vehicle (ROV), comprising:
a TMS-to-ROV umbilical interface configured to receive electrical power;
an ROV power distributor operatively in communication with the TMS-to-ROV umbilical interface and configured to distribute electrical power;
an ROV electrical power supply operatively in communication with the ROV power distributor;
an ROV telemetry controller;
an ROV external electrical power interface; and
an ROV electrical switch operatively in communication with the ROV power distributor, the ROV electrical power supply, and the ROV external electrical power interface, the ROV electrical switch configured to selectively allow electrical power to flow from the TMS-to-ROV umbilical interface to the ROV electrical power supply or to selectively allow electrical power to flow from the TMS-to-ROV umbilical interface to the ROV external electrical power interface;
a tether management system (TMS), comprising:
a TMS telemetry controller;
a TMS-to-surface umbilical interface configured to receive electrical power from a remote electrical power source;
a TMS power distributor operatively in communication with the TMS-to-surface umbilical interface and configured to distribute the electrical power;
a TMS external electrical power interface operatively in communication with the TMS power distributor;
a TMS electrical power supply;
a TMS electrical switch operatively in communication with the TMS power distributor, the TMS electrical power supply, and the TMS external electrical power interface, the TMS electrical switch configured to selectively allow electrical power to flow from the TMS power distributor to the TMS electrical power supply and/or to selectively allow electrical power to flow from the TMS power distributor to the TMS external electrical power interface; and a first TMS-to-ROV umbilical interface operatively in communication with the TMS power distributor;

a first umbilical operatively in communication with the TMS external electrical power interface and the TMS-to-ROV umbilical interface; and a second umbilical operatively in communication with the ROV external electrical power interface, the second umbilical configured to handle power sufficient to power the subsea system;

using the ROV to interconnect the second umbilical to the subsea system interface and the power connector of the subsea system; and using the ROV power distributor to divert a predetermined portion of power available in the ROV to the subsea system sufficient to power the subsea system without using power supplied from a source external to the ROV.

20. The method of providing signaling to a subsea system from a remotely operated vehicle subsea of claim 19, further comprising:

providing the ROV power distributor with a data signal interface;

interfacing the ROV power distributor data signal interface to a data signal processor in the ROV and a data signal processor in the subsea system;

monitoring a subsea system status via the data signal interface; and adjusting the power diversion from the ROV to the subsea system in response to a monitored status value.

\* \* \* \* \*